United States Patent
White

(10) Patent No.: US 10,591,252 B2
(45) Date of Patent: Mar. 17, 2020

(54) OPTICAL DEVICE HAVING REMOVABLE OPTICAL SETTING LEVER

(71) Applicant: Burris Company, Greeley, CO (US)

(72) Inventor: Matthew Travis White, Fort Collins, CO (US)

(73) Assignee: Burris Company, Greeley, CO (US)

( * ) Notice: Subject to any disclaimer, the term of this patent is extended or adjusted under 35 U.S.C. 154(b) by 132 days.

(21) Appl. No.: 15/279,173

(22) Filed: Sep. 28, 2016

(65) Prior Publication Data

US 2018/0087872 A1 Mar. 29, 2018

(51) Int. Cl.
*G02B 23/00* (2006.01)
*F41G 1/38* (2006.01)
*G02B 23/16* (2006.01)

(52) U.S. Cl.
CPC .............. *F41G 1/38* (2013.01); *G02B 23/16* (2013.01)

(58) Field of Classification Search
CPC ...... G02B 23/00; G02B 23/16; G02B 23/145; G02B 7/04; G02B 7/10; G02B 7/02; G02B 27/36; F41G 1/00; F41G 1/16; F41G 1/38; F41G 1/473; F41G 3/02; F41G 3/06; F41G 11/001; F41G 1/345; F16H 59/0278; G05G 1/08; G05G 1/082; G05G 1/12; G03B 21/14
USPC ..... 359/399, 422–425, 812, 823–825; 42/85, 42/90, 119, 122, 143, 111, 115, 125, 129, 42/136; 235/404, 406, 454; 74/813 R
See application file for complete search history.

(56) References Cited

U.S. PATENT DOCUMENTS

| 5,521,757 | A | * | 5/1996 | Olson | ................... | F41G 11/001 |
| | | | | | | 359/399 |
| 7,703,679 | B1 | | 4/2010 | Bennetts et al. | | |
| 8,516,735 | B2 | | 8/2013 | Ilacqua | | |
| 8,625,211 | B2 | | 1/2014 | Lim | | |
| 2012/0105951 | A1 | * | 5/2012 | Lim | .......................... | F41G 1/38 |
| | | | | | | 359/422 |
| 2017/0059847 | A1 | * | 3/2017 | Lim | ..................... | G02B 23/145 |
| 2018/0120060 | A1 | * | 5/2018 | Schmidt | ................... | F41G 1/38 |

OTHER PUBLICATIONS

Nightforce Optics, Inc., "NightForce Power Throw Lever (PTL)", located online on Oct. 10, 2016 at: http://nightforceoptics.com/accessories/ptl, 2 pgs.
Nightforce Optics, Inc., "NXS 1-4 x 24 Compact Riflescope", located online on Oct. 10, 2016 at: http://nightforceoptics.com/nxs/1-4x24, 2 pgs.
Vortex Optics, "SV-1 Switchview Throw Lever", located online on Oct. 10, 2016 at: http://www.vortexoptics.com/product/vortex-switchview-throw-lever-sv-1, 3 pgs.
Switchview, "Switchview Levers", located online on Oct. 10, 2016 at: http://www.mgmswitchview.com/, 1 page.
MK Machining, "Throw Levers", located online on Oct. 10, 2016 at: https://mkmachining.com/index.php/product/index/1, 19 pgs.

(Continued)

*Primary Examiner* — Mustak Choudhury

(57) ABSTRACT

An optical device has a housing and an adjustment ring rotatably disposed about the housing. The adjustment ring defines a channel. A lever selectively engages with the channel and may be used to rotate the adjustment ring.

20 Claims, 8 Drawing Sheets

(56) References Cited

OTHER PUBLICATIONS

Bushnell, "1-4 x 24mm Throw Down PCL", located online on Oct. 10, 2016 at: http://bushnell.com/tactical/riflescopes/ar-optics/1-4x-24mm-throw-down-pcl, 6 pgs.
Leupold & Stevens, "VX-6 7-42x56mm (34mm) Side Focus Target", located online on Oct. 10, 2016 at: https://www.leupold.com/hunting-shooting/scopes/vx-6-riflescopes/vx-6-7-42x56mm-34mm-side-focus-target/, 23 pgs.
Nightforce Optics, Inc., "ATACR Advance Tactical Riflescope 4-16x42 Fl", PDF, Sheet VI, obtained Oct. 12, 2016, 2 pgs.

\* cited by examiner

OPTICAL DEVICE HAVING REMOVABLE OPTICAL SETTING LEVER

INTRODUCTION

Some types of shooting require quick changes in magnification or other optical settings. In the case of magnification, the quick changes can be cumbersome with the simple round profile of most scope power rings. Some solutions to this problem contemplate a fixed protuberance on the adjustable power ring. This allows shooters to gain leverage to ease changes in magnification. One such configuration is depicted in FIG. 1A. Here, an optical device 10 has a housing 12 and an integral adjustment ring 14. A lever 16 extends from the ring 14. This design, however, does not accommodate individual shooter preference. That is, a shooter must use the optical device 10 with the lever 16 as positioned at the manufacturer. Another configuration is depicted in FIG. 1B, where an optical device 50 has a housing 52 and an integral adjustment ring 51. A clamp mechanism 58 includes a body 60 and a lever 56 extending therefrom. The body 60 of the clamp mechanism 58 is secured around the integral adjustment ring 51, so that an inner surface of the body 60 may engage with the ring 51, e.g., via compressive engagement with the knurling 62 thereon. This design, while adjustable, is subject to failure. For example, the engagement between the clamp mechanism 58 and the knurling 62 may deteriorate over time, e.g., due to wear of the engaging surfaces, or due to changes in ambient temperature that cause materials to swell and shrink at different rates.

SUMMARY

In one aspect, the technology relates to an optical device having a housing having a housing axis; an adjustment ring rotatably disposed about the housing, wherein the adjustment ring defines at least one channel; and a lever selectively engagable with the at least one channel. In an embodiment, the lever has a base configured to fit within the channel. In another embodiment, the channel and the base include substantially similar shapes. In yet another embodiment, at least one channel includes a plurality of channels. In still another embodiment, each of the plurality of channels are oriented substantially parallel to the housing axis.

In another embodiment of the above aspect, the lever is configured to selectively engage with a single one of the plurality of channels. In an embodiment, the lever is configured to selectively simultaneously engage a plurality of the plurality of channels. In another embodiment, the lever is configured to span a plurality of the plurality of channels. In yet another embodiment, the base is configured to slidably engage the channel in along an engagement axis disposed substantially parallel to the housing axis. In still another embodiment, the lever has a fixation element. In another embodiment, the fixation element is configured to apply a force to at least one of the lever and the adjustment ring.

In another aspect, the technology relates to an optical device having: a housing; an adjustment ring rotatably disposed about the housing and defining a plurality of substantially parallel channels; a lever configured to slidably engage at least one of the plurality of substantially parallel channels; and a fixation element disposed on at least one of the ring and the lever for releasably fixing the lever in at least one channel of the plurality of substantially parallel channels. In an embodiment, the fixation element has a set screw disposed in the lever, wherein rotation of the set screw displaces the lever in a direction substantially orthogonal to the at least one channel. In another embodiment, the fixation element has a friction element disposed on the lever. In yet another embodiment, the friction element includes a material having a coefficient of friction greater than a coefficient of friction of at least one of the plurality of substantially parallel channels. In still another embodiment, the optical device further includes a spring for biasing the friction element into a surface of at least one of the plurality of substantially parallel channels.

In another embodiment of the above aspect, the fixation element has a detent. In an embodiment, the detent is disposed on at least one of the lever and the channel. In another embodiment, at least one channel of the substantially parallel channels includes a neck.

In another aspect, the technology relates to a method of adjusting an optical setting of an optical device, the method including: inserting at least a portion of a lever into a channel defined by an adjustment ring of the optical device, wherein the channel is substantially parallel to a longitudinal axis of the optical device; and applying a force to the lever so as to rotate the adjustment ring so as to adjust the optical setting of the optical device.

BRIEF DESCRIPTION OF THE DRAWINGS

There are shown in the drawings, embodiments which are presently preferred, it being understood, however, that the technology is not limited to the precise arrangements and instrumentalities shown.

DETAILED DESCRIPTION

The present technology relates to new and improved embodiments of known sighting systems and methods (such as those described in U.S. Pat. No. 7,703,679, the disclosure of which is hereby incorporated by reference herein in its entirety), for correctly aiming a firearm or other implement. As used herein, a "sighting system" shall be construed broadly and is defined as one or more optical devices that assist a person in aiming a projectile launch system, such as a firearm, a rifle, or other implement. The disclosed technology has application in any type of sighting system or optical device, including those with addressable aiming elements and those without. For example, the disclosed technology may also be used with binoculars, monoculars, or ranging systems. In this application, a riflescope will be described as an exemplary embodiment.

Figure 1A:
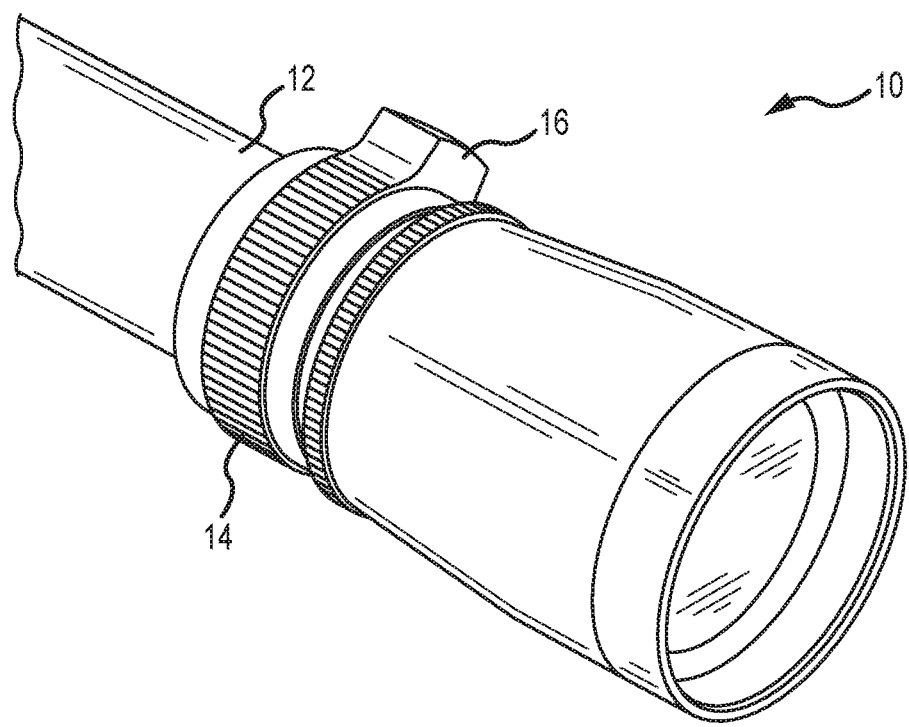
FIGS. 1A-1B depict prior art adjustment mechanisms.
Figure 1B:
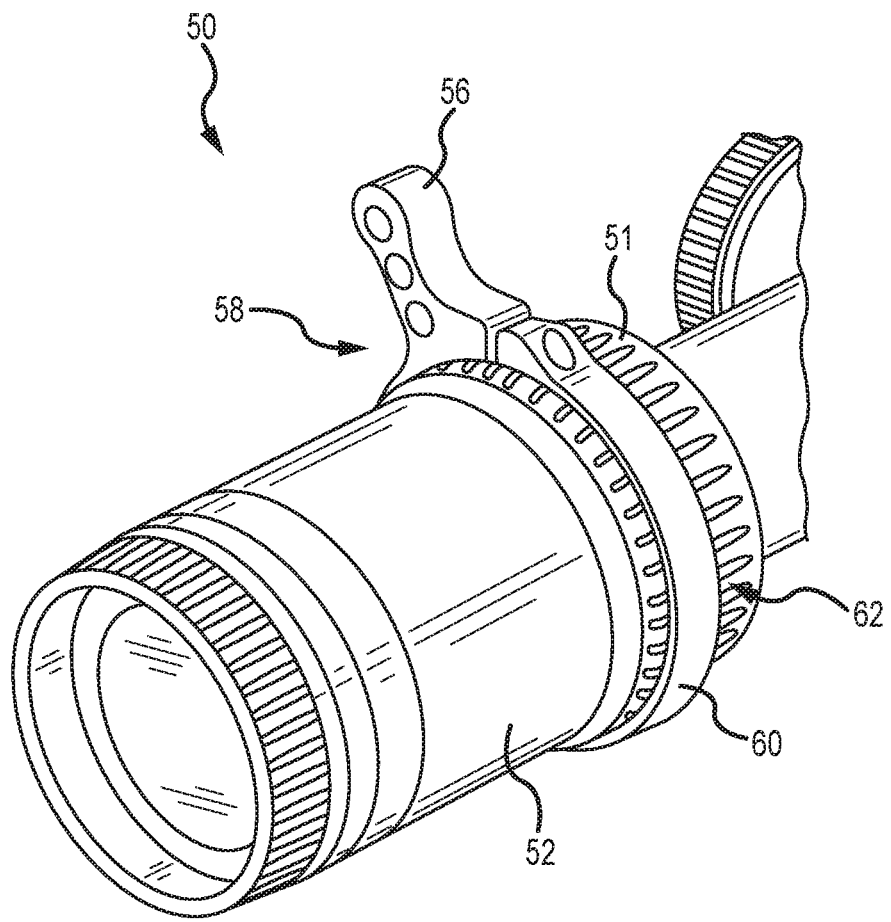
Figure 2:
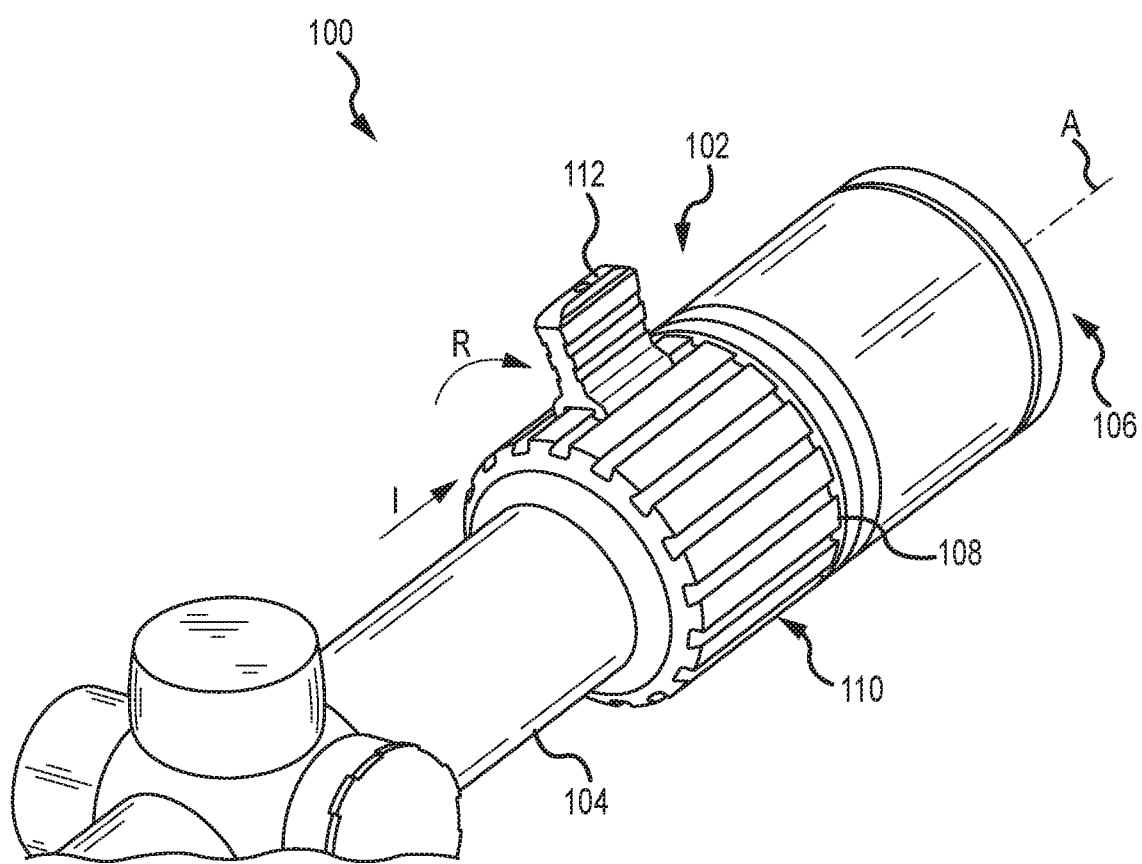
FIG. 2 depicts a partial perspective view of an optical device incorporating an adjustment mechanism.

FIG. 2 depicts a partial perspective view of an optical device 100 incorporating an adjustment mechanism 102. The optical device 100 is a riflescope and includes a housing 104 comprising a housing axis A. The adjustment mechanism 102 is disposed proximate an ocular end 106 of the housing 104 so as to be easily accessed by a shooter. The adjustment mechanism 102 includes an adjustment ring 108 that is rotatably disposed about the housing 104. In the depicted example, the adjustment ring 108 is integral with the optical device 100, in that the device 100 is manufactured with the adjustment ring 108. Indeed, most optical devices include a number of integral rotating knobs, rings, and/or turrets that are used to adjust one or more optical settings of the device. The adjustment ring 108 defines one or more channels 110 about the outer circumference of the ring 108. These channels 110 may be substantially aligned with or parallel to the housing axis A. Rotation of the adjustment ring 108 may be accomplished by simply gripping the outer surface thereof and rotating R the ring 108 about the housing 104. However, under certain conditions, the adjustment ring 108 may be difficult to grip (e.g., due to use of gloves on the hand of the shooter), or may not be easy to turn quickly under shooting conditions.

As such, the adjustment mechanism 102 also includes a lever 112 that may be slidably engaged with the adjustment ring 108. More specifically, a portion of the lever 112 may be inserted I along an axis of at least one of the channels 110, depending on the configuration of the components. Since the channels 110 are disposed substantially parallel to the longitudinal housing axis A, the insertion I is in a direction also substantially parallel thereto. The shooter may selectively determine with which channel 110 the lever 112 is engaged, depending on convenience, shooter reach, preference, and other factors. While sliding insertion I is depicted, other types of engagement are also contemplated. In the depicted example, the lever 112 is slid into the channel 110 to a desired position. The lever 112 is selectively secured in position by a fixation element, examples of which are depicted and described below. Once positioned as desired, the shooter may apply a force to the lever 112 so as to rotate R the lever 112 in either direction, thereby adjusting an optical setting of the optical device 100. The increased leverage provided by the lever 112 makes adjustment easier.

Figure 3:
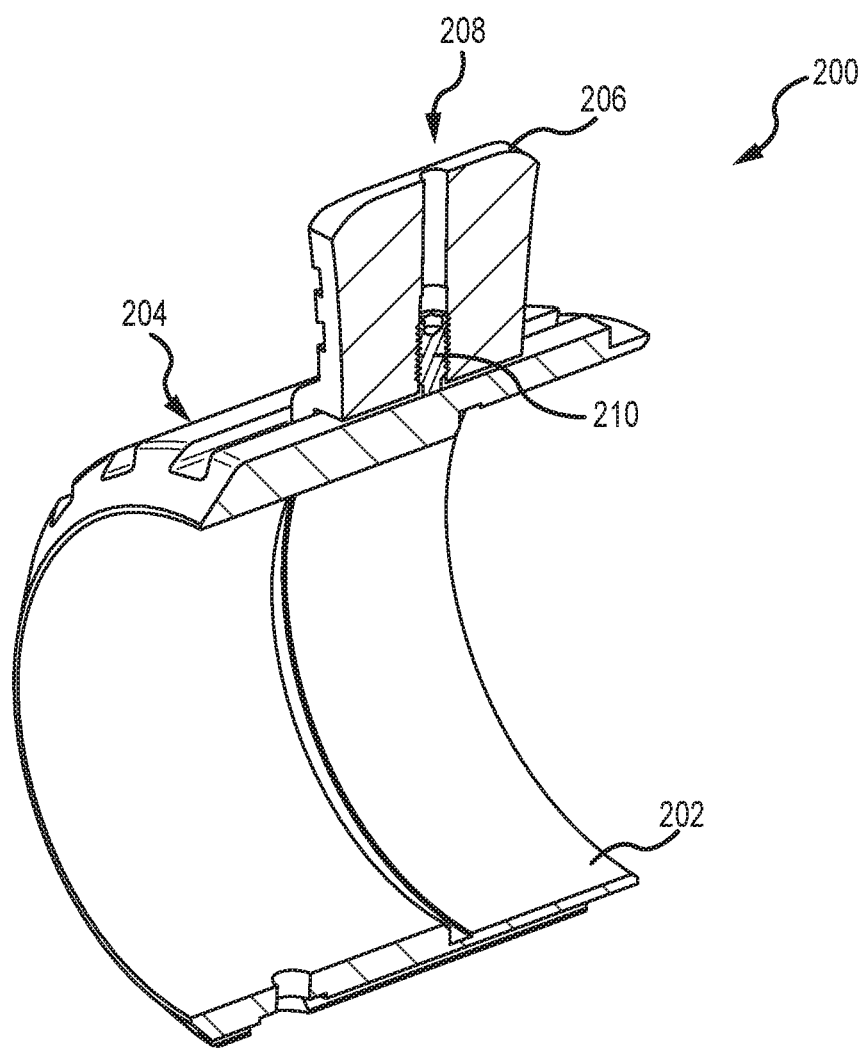
FIG. 3 depicts a partial sectional perspective view of an adjustment mechanism.

FIG. 3 depicts a partial sectional perspective view of an adjustment mechanism 200. As described above, the adjustment mechanism 200 includes an adjustment ring 202 defining a plurality of channels 204. A lever 206 is slidably engaged with at least one of the channels 204. In the depicted adjustment mechanism 200, the lever 206 defines an access slot 208. A fixation element in the form of a set screw 210 is disposed in the access slot 208. Rotation of the set screw 210 displaces the lever 206 away from the adjustment ring 202. Due to the mating configuration of the lever 206 and ring 202, as described below, the set screw 210 causes engagement of a portion of the lever 206 with a portion of the channel 204 to hold the lever 206 securely in position. This mating engagement is described in more detail below.

Figure 4:
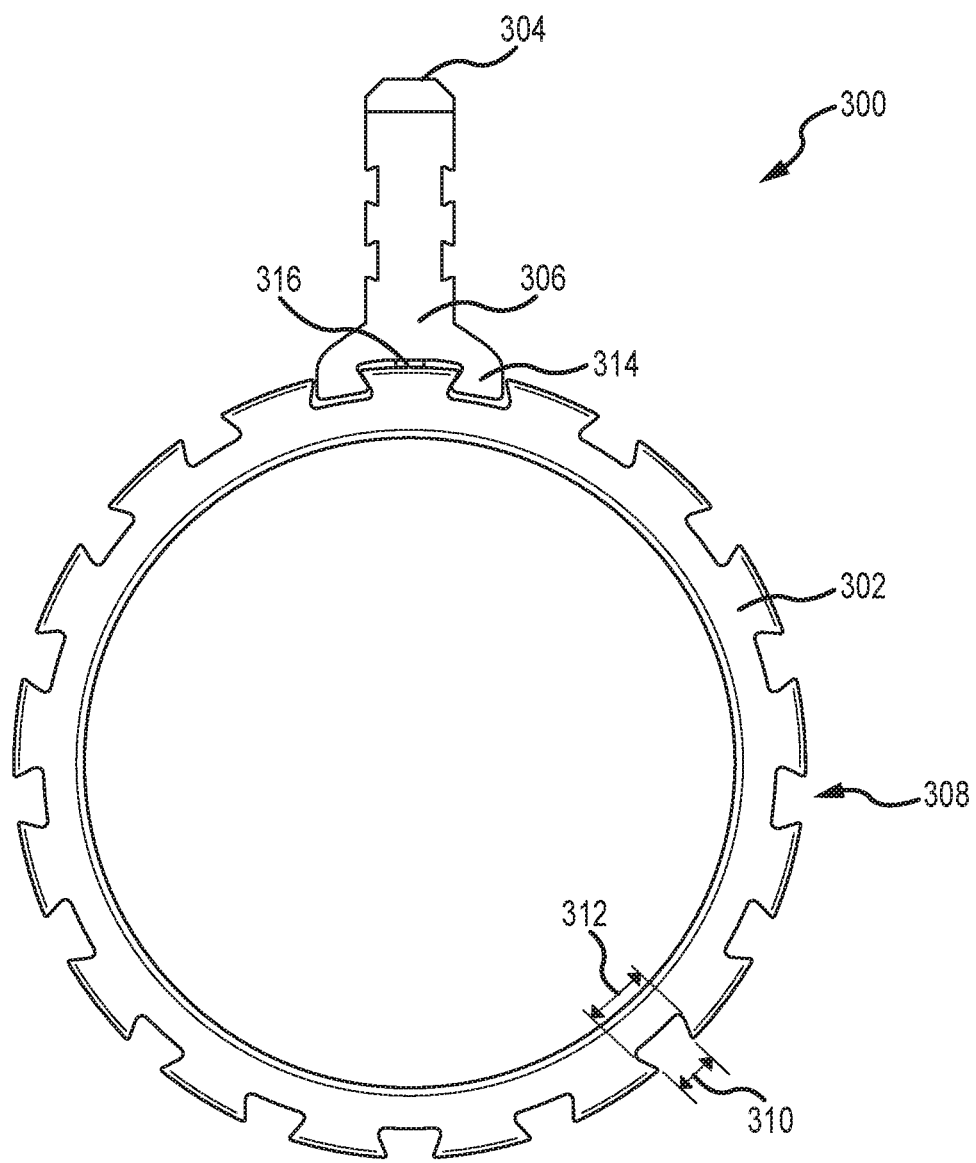
FIG. 4 depicts a partial sectional view of an adjustment mechanism.

FIG. 4 depicts a partial sectional view of an adjustment mechanism 300. As described above, the adjustment mechanism 300 includes an adjustment ring 302 and a lever 304 matingly engaged with the ring 302. More specifically, the lever 304 includes a base 306 that is configured to engage with one or more channels 308 defined by the ring 302. As can be seen from FIG. 4, each channel 308 has a neck 310 having a width less than that of the channel base 312. Thus, a base 306 having legs 314 with a maximum width larger than the neck 310 is prevented from being pulled orthogonally from the channel 308. The legs 314 and channel 308 have substantially similar trapezoidal shapes, although other shapes are contemplated. Two legs 314 are disposed so as to span two adjacent channels 310, but other configurations are also contemplated (e.g., three legs spanning three channels, one leg in one channel, etc.). A set screw 316 applies a force between the lever 304 and the ring 302, so as to displace the lever 304 away from the adjustment ring 302, thus engaging the wider leg 314 with the narrower neck 310, thus fixing the lever 304 in place. Since the channels 310 are arranged substantially uniformly about the circumference of the ring 302, the lever 304 may be placed anywhere about the ring 302.

Figure 5:
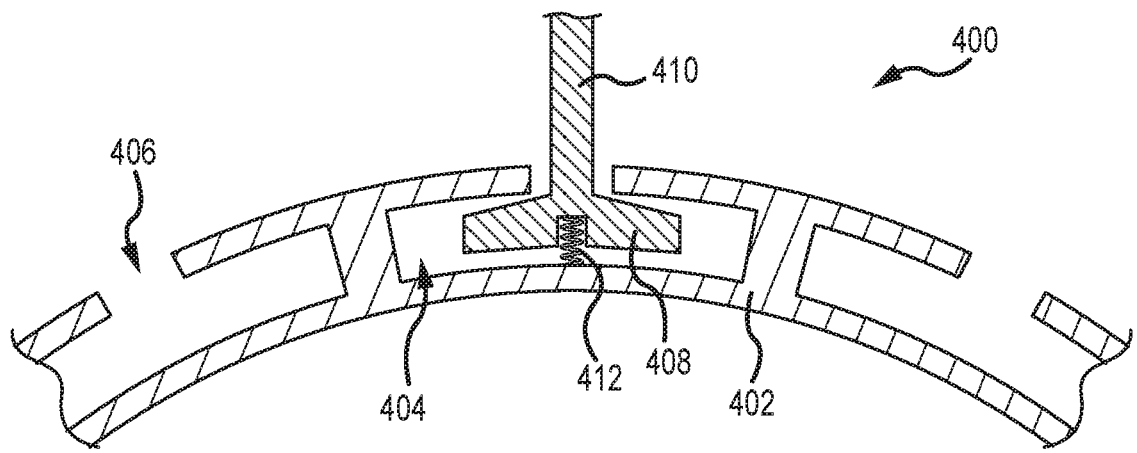
FIGS. 5-7 depict partial sectional views of adjustment mechanisms.
Figure 6:
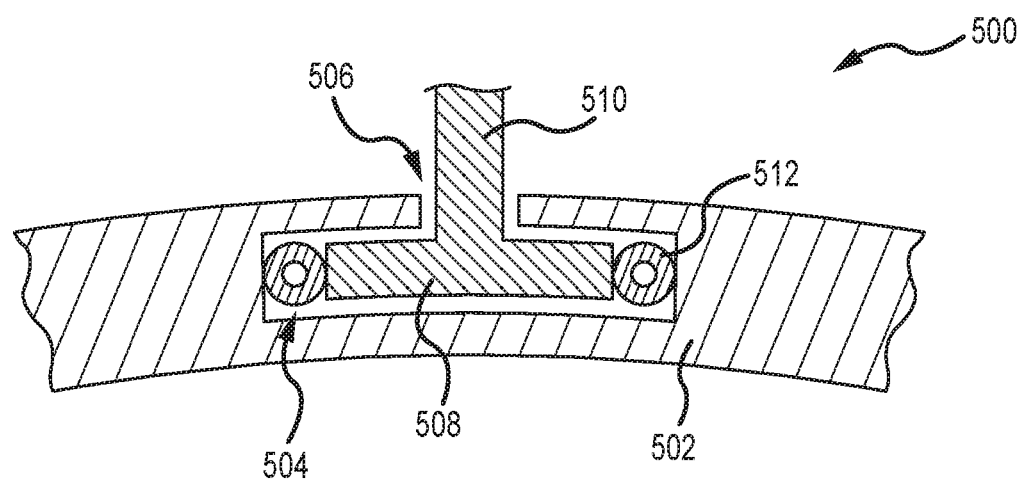
Figure 7:
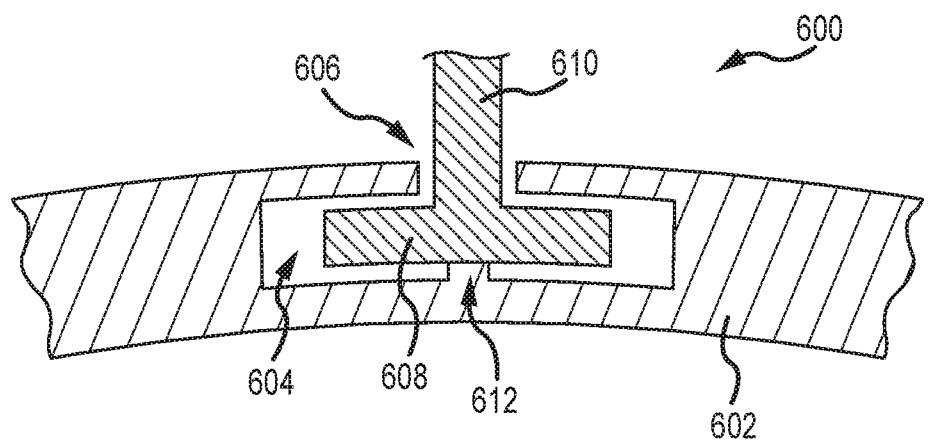

FIGS. 5-7 depict partial sectional views of adjustment mechanisms. FIG. 5, for example, depicts an adjustment mechanism 400 that includes an adjustment ring 402 defining a plurality of channels 404, each having a neck 406 wider than a base 408 of a lever 410. Here, the lever 410 engages with only a single channel 404 at any given time. A coil spring 412, elastomer element, leaf spring, or other biasing element is disposed within the base 408 and biases the lever 410 away from the ring 402, thus fixing the lever 410 within the channel 404. When a shooter desires to move the lever 410 within the channel 404, the shooter depressed the lever 410 so as to compress the spring 412. The lever 410 may then be slid within the channel 404, to be repositioned or removed. The sliding surfaces between the base 408 and channel 404 may have a low coefficient of friction, so as to allow for smooth movement of the lever 410, prior to engagement or activation of the fixation element, the spring 412 in this example.

FIG. 6 depicts an adjustment mechanism 500 that includes an adjustment ring 502 defining a plurality of channels 504, each having a neck 506 wider than a base 508 of a lever 510. Here, the fixation element 512 is a resilient material that extends from the base 508 of the lever 510. The fixation element 512 resists movement of the lever 510 by increasing a coefficient of friction between the lever 510 and the channel 504. However, this coefficient of friction may be overcome by a shooter by applying sufficient force to the lever 510, so as to slide that element within the channel 504.

FIG. 7 depicts an adjustment mechanism 600 that includes an adjustment ring 602 defining a plurality of channels 604, each having a neck 606 wider than a base 608 of a lever 610. Here, the fixation element 612 is a ramped detent that extends from an inner surface of the channel 604. The ramped detent 612 may be disposed at a location within the channel 604, allowing a shooter may force the base 608 into contact with the detent 612. This fixes the position of the lever 610 within the channel 604 by forcing one or more surfaces of the lever 610 into contact with one or more other surfaces of the channel 604. To remove the lever 610, a shooter applies sufficient force to the lever 610 to overcome the resistance provided by the detent 612, so as to slide the lever 610.

Figure 8:
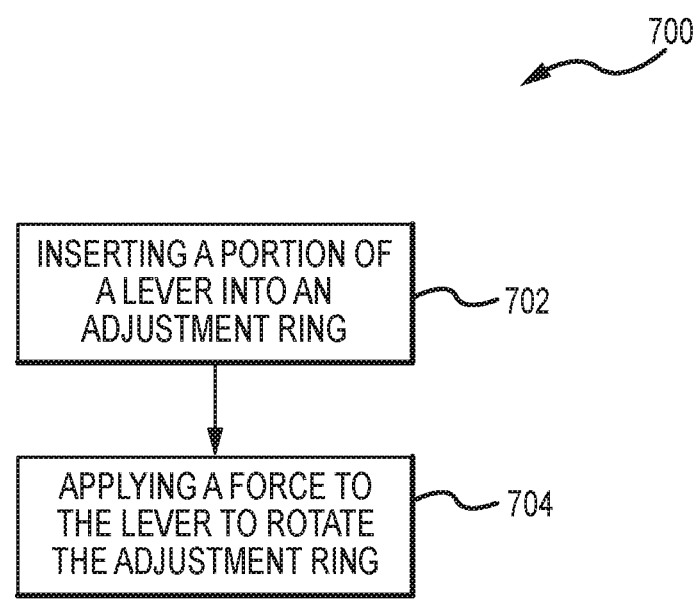
FIG. 8 depicts a method of adjusting an optical setting of an optical device.

FIG. 8 depicts a method 700 of adjusting an optical setting of an optical device. The method includes inserting, into a channel defined by an adjustment ring of an optical device, a portion of a lever, operation 702. The channel and inserted portion may be any of those described above, or equivalents thereof. In examples, the lever is slidingly inserted. In operation 704, a force is applied to the lever so as to rotate the adjustment ring. This rotation adjusts an optical setting, for example a magnification setting, of the device.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An optical device comprising:
    a housing comprising a housing axis;
    an adjustment ring rotatably disposed about the housing, wherein the adjustment ring defines at least one channel; and
    a lever comprising a base selectively insertable into the at least one channel.

2. The optical device of claim 1, wherein the base is configured to fit within the channel.

3. The optical device of claim 2, wherein the channel and the base comprise substantially similar shapes.

4. The optical device of claim 2, wherein the base is configured to slidably engage the channel along an engagement axis disposed substantially parallel to the housing axis.

5. The optical device of claim 1, wherein the adjustment ring comprises a plurality of channels.

6. The optical device of claim 5, wherein each of the plurality of channels are oriented substantially parallel to the housing axis.

7. The optical device of claim 5, wherein the lever is configured to selectively engage with a single one of the plurality of channels.

8. The optical device of claim 5, wherein the base comprises a plurality of legs configured to selectively simultaneously engage at least two of the plurality of channels.

9. The optical device of claim 5, wherein the base is configured to span at least two of the plurality of channels.

10. The optical device of claim 1, wherein the lever comprises a fixation element.

11. The optical device of claim 10, wherein the fixation element is configured to apply a force to at least one of the lever and the adjustment ring.

12. An optical device comprising:
    a housing;
    an adjustment ring rotatably disposed about the housing and defining a plurality of substantially parallel channels;
    a lever comprising a base configured to be slidably insertable into at least one of the plurality of substantially parallel channels; and
    a fixation element disposed on at least one of the ring and the lever for releasably fixing the lever in at least one channel of the plurality of substantially parallel channels.

13. The optical device of claim 12, wherein the fixation element comprises a set screw disposed in the lever, wherein rotation of the set screw displaces the lever in a direction substantially orthogonal to the at least one channel.

14. The optical device of claim 12, wherein the fixation element comprises a biasing element disposed on the lever.

15. The optical device of claim 14, wherein the biasing element comprises a material having a coefficient of friction greater than a coefficient of friction of at least one of the plurality of substantially parallel channels.

16. The optical device of claim 15, wherein the biasing element comprises a spring for biasing the base into a surface of at least one of the plurality of substantially parallel channels.

17. The optical device of claim 12, wherein the fixation element comprises a detent.

18. The optical device of claim 17, wherein the detent is disposed on at least one of the lever and the channel.

19. The optical device of claim 12, wherein at least one channel of the substantially parallel channels comprises a neck.

20. A method of adjusting an optical setting of an optical device, the method comprising:
    slidably inserting at least a portion of a lever into a channel defined by an adjustment ring of the optical device, wherein the channel is substantially parallel to a longitudinal axis of the optical device; and
    applying a force to the lever so as to rotate the adjustment ring so as to adjust the optical setting of the optical device.

* * * * *